United States Patent
Kumar et al.

(10) Patent No.: US 6,194,850 B1
(45) Date of Patent: Feb. 27, 2001

(54) SYSTEM AND METHOD FOR DETERMINING TRUE GROUND SPEED IN A LOCOMOTIVE

(75) Inventors: Ajith Kuttannair Kumar, Erie; Bret Dwayne Worden, Union City, both of PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/378,945

(22) Filed: Aug. 23, 1999

(51) Int. Cl.$^7$ ............................................. B61C 15/08
(52) U.S. Cl. ...................... 318/52; 318/587; 318/583; 318/59; 364/426.05; 324/160; 324/161
(58) Field of Search ........................ 324/160, 161, 324/587; 318/59, 583, 52; 388/907.5; 364/426.05

(56) References Cited

U.S. PATENT DOCUMENTS

| | | | |
|---|---|---|---|
| 4,186,331 | * 1/1980 | DeBuhr et al. | 318/52 |
| 4,347,569 | * 8/1982 | Allen, Jr. et al. | 364/426 |
| 4,634,887 | * 1/1987 | Balch et al. | 290/3 |
| 4,763,263 | * 8/1988 | Leiber | 364/426 |
| 4,896,090 | 1/1990 | Balch et al. | 318/52 |
| 5,436,538 | * 7/1995 | Garvey et al. | 318/52 |
| 5,480,220 | 1/1996 | Kumar | 301/151 |
| 5,610,819 | * 3/1997 | Mann et al. | 364/426.05 |
| 6,104,148 | * 8/2000 | Kumar et al. | 318/52 |

* cited by examiner

*Primary Examiner*—Robert E. Nappi
*Assistant Examiner*—Rita Leykin
(74) *Attorney, Agent, or Firm*—Jill M. Breedlove; Carl A. Rowold

(57) ABSTRACT

A processor system and method for accurately determining true ground speed in a vehicle having wheel-axles propelled by traction motors is provided. The vehicle is equipped with a radar unit for providing a radar signal indicative of vehicle speed relative to the ground. The radar signal is accurate when averaged over a sufficiently long period of time but may be susceptible to undesirable short term variations. The vehicle is further equipped with speed sensors coupled to the wheel-axles to supply respective wheel-axle speed signals. The respective wheel-axle speed signals may be accurate over a sufficiently short period of time but may also be susceptible to undesirable long term variations. The processor system is made up of a first subprocessor coupled to process the respective wheel-axle speed signals to supply a wheel-axle speed signal limited to a rate within a range that varies based on predetermined operational parameters of the vehicle, and a second subprocessor coupled to process the radar signal and the rate-limited wheel-axle speed signal from the first subprocessor to supply the true ground speed of the vehicle. The second subprocessor includes a filter coupled to supply an estimated creep signal substantially free of any undesirable short-term variation due to the radar signal. The second subprocessor further includes a first processor module coupled to process the estimated creep signal from the filter to substantially reduce any undesirable long term variations in the wheel-axle speed signals.

12 Claims, 2 Drawing Sheets

SYSTEM AND METHOD FOR DETERMINING TRUE GROUND SPEED IN A LOCOMOTIVE

BACKGROUND OF THE INVENTION

The present invention is related to an improved system and method for determining true ground speed in a vehicle, such as a locomotive or a transit vehicle, propelled by electric traction motors, and, more particularly, to a processor system and method for accurately determining true ground speed in the vehicle through the combined use of respective speed signals from a radar unit and other electromechanical speed sensors, such as tachometers.

Vehicles, such as locomotives, used for heavy haul applications are generally required to produce a substantially high level of tractive effort (adhesion) between the wheels of the vehicle and the rails on which the vehicle travels. The required high level of adhesion is achieved by controlling creep or wheel slip to within acceptable levels. As used herein creep or wheel slip is the difference between wheel speed and the vehicle speed. Thus, effective creep control requires accurate knowledge of the true ground speed of the locomotive.

Presently known techniques for computing or determining the true locomotive ground speed of the vehicle have generally used a true ground speed sensor, such as a radar unit, and have further used electromechanical speed sensors, such as tachometers, for obtaining wheel-axle speed values that are processed for estimating the locomotive true ground speed, which is used for controlling the creep of each axle. Generally, such techniques for computing the locomotive ground speed, have relied principally either on the radar signal for determining the value of the vehicle speed or, when such radar signal is not available or disabled, then the respective speed signals from the electromechanical sensors are used as backup. Although the radar signal may be substantially accurate when averaged over a sufficiently long period of time, the radar signal may also be generally susceptible to undesirable short term variations or oscillations, such as may occur due to radar dropouts and low frequency oscillations. The severity of the low frequency oscillations may depend on various characteristics of the locomotive, the equipment, and/or the environment in which the locomotive travels, such as vibration of the locomotive, rail track and/or terrain profile, the specific operating characteristics of the radar unit and manner of installation, etc. Similarly, the radar dropouts may occur due to the presence of snow on the ground, physical obstructions such as grade crossings, etc. In view of the above, the radar signal may be characterized as having a substantially accurate DC/average information content but not necessarily accurate instantaneous information. Conversely, the speed signals from the electromechanical sensors may be characterized as having substantially accurate instantaneous information of the wheel speed but not necessarily accurate long term stability due to creep.

Unfortunately, the presently known techniques for computing the true ground speed measurements used for creep control in the locomotive generally suffer from various drawbacks due to the foregoing undesirable characteristics of the radar signal and due to the fact that such techniques have not taken advantage of the positive characteristics present in the speed signals from the electromechanical sensors to complement the positive characteristics of the radar signal. Thus, such techniques have not been very conducive for providing effective tractive effort in the locomotive when the radar signal deteriorates or during periods of high acceleration or braking. For example, the foregoing variations in the radar signal could cause the calculated true ground speed of the vehicle to drop below its actual true ground speed. In this case, a controller that provides creep control in the locomotive, would erroneously reduce the tractive effort since the creep controller would estimate that the creep is higher than it actually is. The fictitious creep or wheel slip could result in unnecessary activation of the sanding valves in the locomotive with wasteful loss of the sand and the risk of equipment clogging or contamination due to the sand. Conversely, the variations in the radar signal could cause the calculated true ground speed of the vehicle to be above its actual true ground speed, and again cause the creep controller to erroneously reduce tractive effort since the controller in this case would estimate that the creep is lower than it actually is. This could result in increased locomotive vibration and reduced wheel life since the controller would allow for more creep than is permissible.

In view of the drawbacks described above, it would be desirable to provide a processor system and method for accurately determining the true ground speed of the locomotive that takes advantage of the fact that the radar signal from the available radar unit is substantially accurate when averaged over a sufficiently long period of time. It would be further desirable to provide a processor system and method that further takes advantage of the fact that the available electromechanical speed sensors, such as tachometers, provide substantially accurate instantaneous measurements of the vehicle speed. In other words, it would be desirable to provide a processor system and method configured to utilize the positive complementary characteristics of the radar signal and the respective speed signals from the electromechanical sensors to provide effective wheel slip control at all times of locomotive operation, including periods when the radar signal may be temporarily disabled, and further including periods where frequent and substantial high acceleration or braking may be expected, such as during light load operations, train yard operations, high grade climbs or descents, and the like.

BRIEF SUMMARY OF THE INVENTION

Generally speaking, the present invention fulfills the foregoing needs by providing a processor system for accurately determining true ground speed in a vehicle having wheel-axles propelled by traction motors. The vehicle is equipped with a radar unit for providing a radar signal indicative of vehicle speed relative to the ground. The radar signal may be substantially accurate when averaged over a sufficiently long period of time but may be generally susceptible to undesirable short term variations. The vehicle is further equipped with speed sensors coupled to the wheel-axles to supply respective wheel-axle speed signals. The respective wheel-axle speed signals may be substantially accurate over a sufficiently short period of time but may also be generally susceptible to undesirable long term variations due to creep. The processor system is made up of a first subprocessor coupled to process the respective wheel-axle speed signals to supply a wheel-axle speed signal limited to a rate within a range that varies based on predetermined operational parameters of the vehicle, and a second subprocessor coupled to process the radar signal and the rate-limited wheel-axle speed signal from the first subprocessor to supply the true ground speed of the vehicle. The second subprocessor includes a filter coupled to supply an estimated creep signal being substantially free of any undesirable short-term variation due to the radar signal. The second subprocessor further includes a first processor module coupled to process the estimated creep signal from the filter to substantially reduce any undesirable long term variations in the wheel-axle speed signals.

The present invention further fulfills the foregoing needs by providing a method for accurately determining true ground speed in a vehicle having wheel-axles propelled by traction motors. The vehicle equipped with a radar unit for providing a radar signal indicative of vehicle speed relative to the ground. The radar signal being substantially accurate when averaged over a sufficiently long period of time but being generally susceptible to undesirable short term variations. The vehicle is further equipped with speed sensors coupled to the wheel-axles to supply respective wheel-axle speed signals. The respective wheel-axle speed signals being substantially accurate over a sufficiently short period of time but being generally susceptible to undesirable long term variations. The method includes the steps of processing the respective wheel-axle speed signals in a first subprocessor to supply a wheel-axle speed signal limited to a rate within a range that varies based on predetermined operational parameters of the vehicle; and processing the radar signal and the rate-limited wheel-axle speed signal in a second subprocessor to supply the true ground speed of the vehicle. The processing in the second subprocessor including a signal filtering step for supplying an estimated creep signal being substantially free of any undesirable short-term variation due to the radar signal, and further including processing the estimated creep signal to substantially reduce any undesirable long term variations due to the wheel-axle speed signals.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
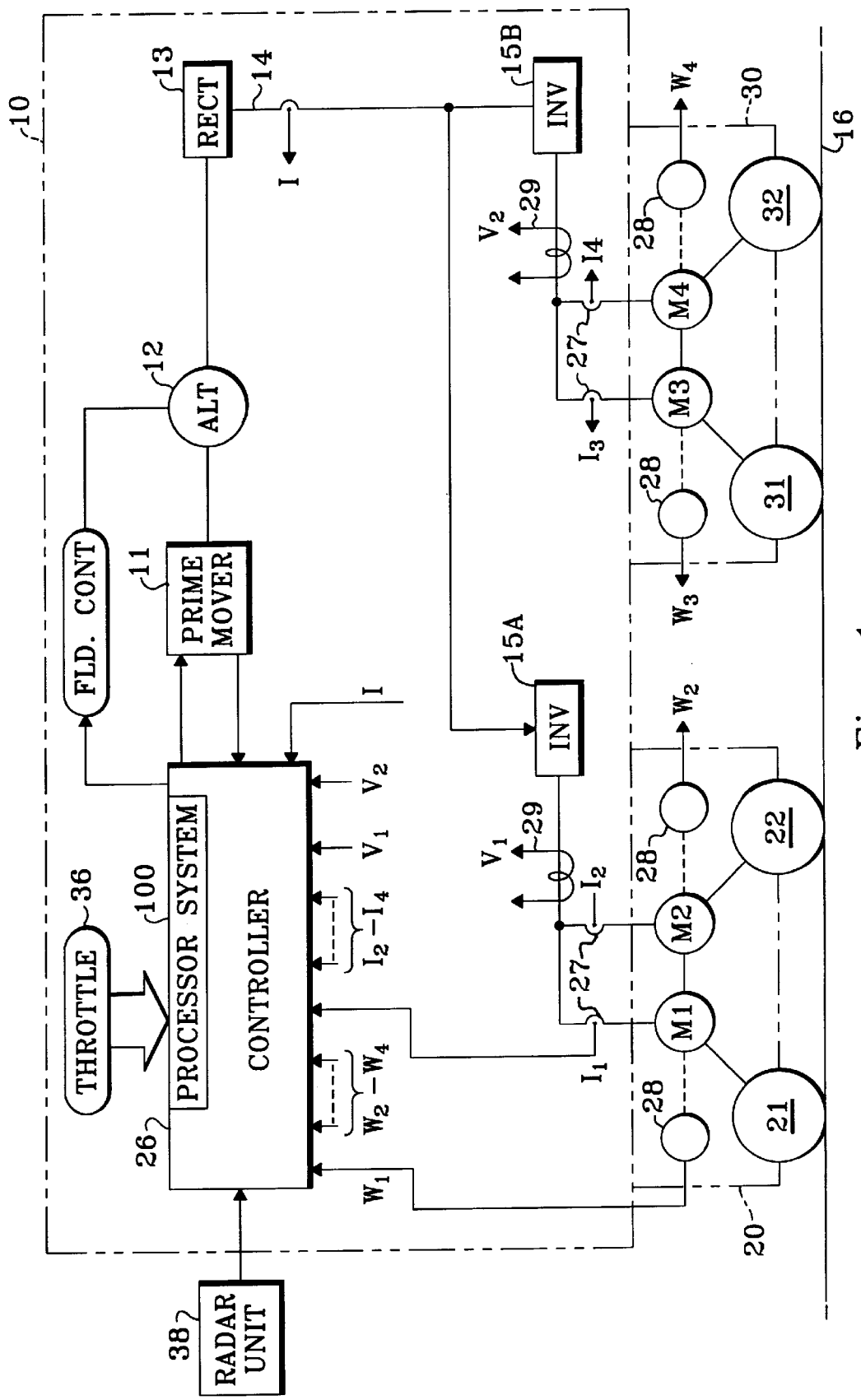
FIG. 1 shows a simplified block diagram of an exemplary propulsion system which could benefit by using a processor system and method in accordance with the present invention.

The present invention may be utilized in various types of vehicles such as, for example, transit cars and locomotives, powered by electric traction motors. For purpose of illustration and not of limitation, the invention is described herein as it may be applied to a locomotive powered by an alternating current (AC) induction motor. The propulsion system 10 of FIG. 1 includes a variable speed prime mover 11 mechanically coupled to a rotor of a dynamo electric machine 12 comprising a 3-phase alternating current (AC) synchronous generator or alternator. The 3-phase voltages developed by alternator 12 are applied to AC input terminals of a conventional power rectifier bridge 13. The direct current (DC) output of bridge 13 is coupled via DC link 14 to a pair of controlled inverters 15A and 15B which inverts the DC power to AC power at a selectable variable frequency. The AC power is electrically coupled in energizing relationship to each of a plurality of adjustable speed AC traction motors M1 through M4. Prime mover 11, alternator 12, rectifier bridge 13 and inverters 15A, 15B are mounted on a platform of the traction vehicle 10, such as a four-axle diesel-electric locomotive. The platform is in turn supported on two trucks 20 and 30, the first truck 20 having two axle-wheel sets 21 and 22 and the second truck 30 having two axle-wheel sets 31 and 32.

Each of the traction motors M1–M4 is hung on a separate axle and its rotor is mechanically coupled, via conventional gearing, in driving relationship to the associated axle-wheel set. In the illustrative embodiment, the two motors M1 and M2 are electrically coupled in parallel with one another and receive power from inverter 15A while motors M3 and M4 are coupled to inverter 15B. However, in some instances, it may be desirable to provide an inverter for each motor or to couple additional motors to a single inverter. Regardless of the specific implementation, motors M1–M4 may operate in a motoring mode, i.e., when electrical power is being conveyed from the propulsion system to the motors. Conversely, motor M1–M4 may operate in an electrical braking mode, i.e., each of motors M1–M4 operates as an electrical generator driven by the inertia of the vehicle, and returning power to the system 10. Suitable current transducers 27 and voltage transducers 29 are used to provide a family of current and voltage feedback signals, respectively, representative of the magnitudes of current and voltage in the motor stators. One or more speed sensors 28, such as tachometers and the like, have been generally used to provide speed signals representative of the rotational speeds of the motor shafts or the wheel-axles. It will be appreciated that the respective speed signals from sensors 28 may be readily converted to vehicle speed in a well known manner. A radar unit 38 is generally used in the locomotive for supplying a radar signal indicative of the speed of the locomotive relative to the ground. As suggested above, present techniques may use some rudimentary combination of the speed signals from sensors 28 or radar unit 38 but such techniques have not necessarily taken full advantage of the advantageous signal characteristics of the radar signal and the speed signals from sensors 28. However, in accordance with the present invention, controller 26 includes a processor system 100, which as will be described in further detail in the context of FIG. 2, allows for providing enhanced accuracy for determining the true ground speed of the vehicle by utilizing the positive characteristics of such speed signals while substantially eliminating their undesirable characteristics. For simplicity of illustration, only single lines have been indicated for power flow although it will be apparent that the motors M1–M4 are typically three phase motors so that each power line represents three lines in such applications.

The magnitude of output voltage and current supplied to rectifier bridge 13 is determined by the magnitude of excitation current supplied to the field windings of the alternator 12. The excitation current is set in response to an operator command (Throttle 36) for vehicle speed by the controller 26 which is in turn responsive to a signal indicative of the true ground speed of the vehicle calculated or determined by processor system 100 in accordance with the teachings of the present invention. The controller 26 converts the speed command to a corresponding torque command for use in controlling the motors M1–M4. Since AC motor torque is proportional to rotor current and air gap flux, these quantities may be monitored or, more commonly, other quantities such as applied voltage, stator current and motor RPM may be used to reconstruct motor torque in controller 26. A more detailed analysis of such techniques is given in U.S. Pat. No. 4,243,927 and in a paper published in IEEE Transactions on Industry Applications, Vol. IA-13, No. 1, January 1977, the IEEE entitled Inverter-Induction Motor Drive For Transit Cars by Plunkett and Plette, the disclosure of each of which is incorporated by reference.

Figure 2:
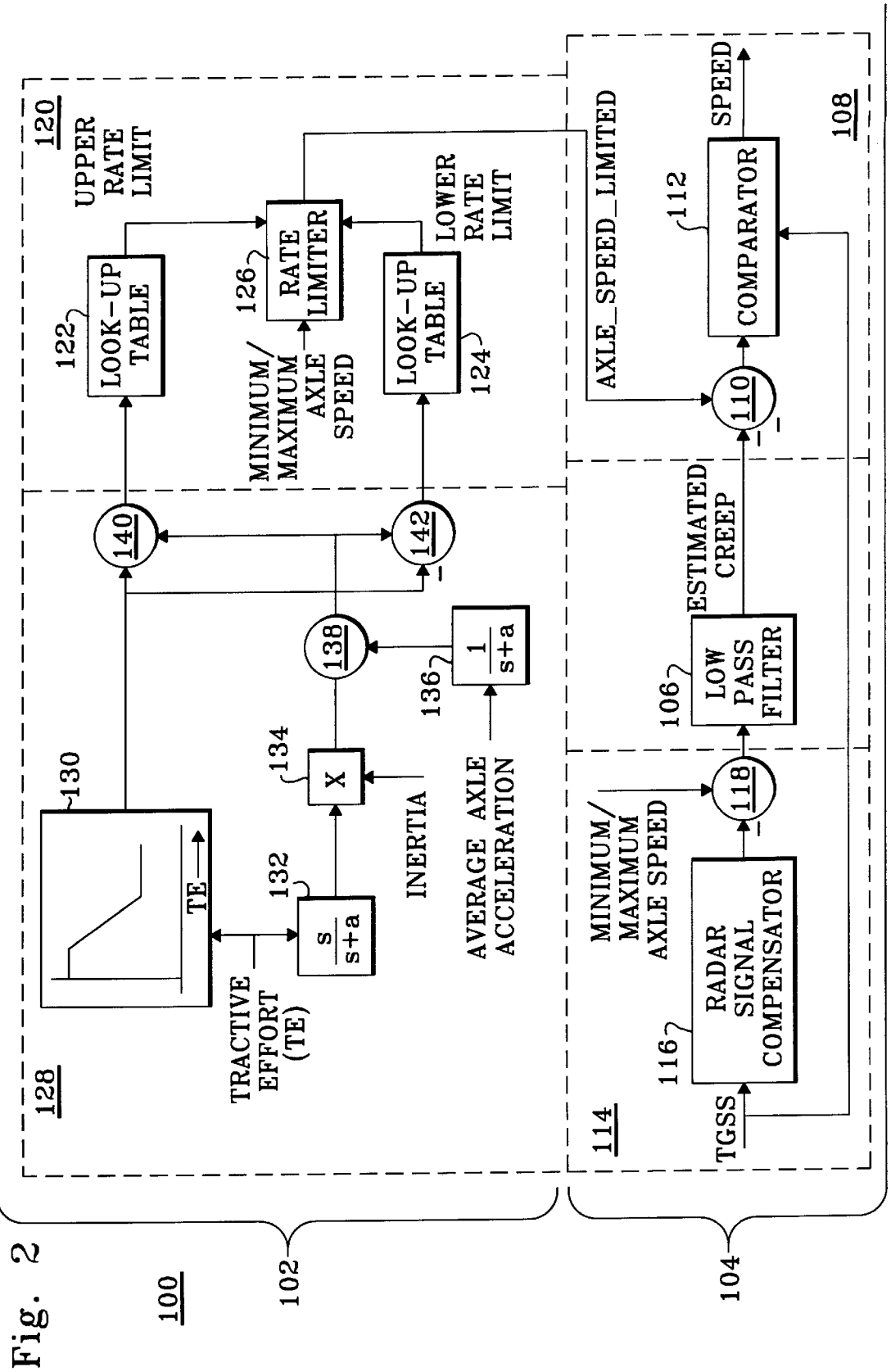
FIG. 2 shows an exemplary embodiment of a processor system in accordance with the present invention.

FIG. 2 shows an embodiment of a processor system 100 in accordance with the present invention. Processor 100 may be used for accurately determining the true ground speed of the vehicle. As previously suggested, the locomotive is equipped with radar unit 38 (FIG. 1) that provides a radar signal indicative of the speed of the vehicle relative to the ground. It will be appreciated by those skilled in the art that the radar signal is substantially accurate when averaged over a sufficiently long period of time but such signal may be susceptible to undesirable short term variations. The locomotive may be further equipped with speed sensors 28 (FIG. 1) electromechanically coupled to supply respective wheel-axle speed signals that may be substantially accurate over a sufficiently short period of time but may also be susceptible to long term instability or drift. Processor system 100 is made up of at first sub-processor 102 which is electrically coupled to process the respective wheel-axle speed signals to supply a wheel-axle speed signal limited to rate changes within a rate range that varies based on predetermined operational parameters of the vehicle. Examples of such operational parameters include the load of the vehicle, the inertia of the vehicle, and tractive effort demand of the vehicle. Second sub-processor 104 is electrically coupled to process the radar signal and the rate-limited wheel-axle speed signal to supply the true ground speed of the vehicle as determined by processor system 100. A second sub-processor 104 includes a filter 106, such as a low pass filter which is electrically coupled to supply an estimated creep signal which is substantial free of any undesirable short term variation due to the radar signal. The bandwidth of low pass filter 106 should be selected to have a cutoff frequency being sufficiently low to cut-off radar signal error which otherwise would be intolerable. Second sub-processor 104 includes a first processor module 108 coupled to process the estimated creep signal from filter 106 to substantially reduce any undesirable long term variations due to the wheel axle speed signals.

First processor module 108 includes a subtractor 110, electrically coupled to supply a difference output signal based on subtraction of the estimated creep signal from the rate-limited wheel-axle speed signal. Comparator 112 is conveniently designed to compare the respective magnitudes of the difference output signal from subtractor 110 and the radar signal so that if the magnitude of the difference output signal is outside a predetermined speed range about the magnitude of the radar signal, then the comparator supplies a comparator output signal which is set to the magnitude of the radar signal. Otherwise, the comparator output signal is set to the magnitude of the difference output signal. The comparator output signal in each case constitutes the true ground speed of the vehicle as determined by processor system 100. For example, if the predetermined speed range is +/−2 km/hr and the radar signal corresponds to a value of 10 km/hr, then for speeds above 12 km/hr or below 8 km/hr, the output signal of the comparator will be set to 10 km/hr. Conversely for speeds within the range, the output signal from the comparator will be set to the magnitude of the difference output signal, so that, if, for example, such value is 11 km/hr, then the output signal from the comparator will be set to 11 km/hr, even though the radar signal indicates 10 km/hr. Second sub-processor 104 further includes a second processor module 114 made up of a radar signal compensator 116 electrically coupled to receive the radar signal from radar unit 38. Radar signal compensator 116 is conveniently configured using techniques well-known in the art to supply an output signal that is substantially compensated for radar lag based on a predetermined lag model of the radar unit. Radar signal compensator may optionally have a sufficiently large memory to store additional respective radar lag models so that if the radar unit is replaced by a new unit having different lag characteristics, the compensation may be implemented using the respective lag model most closely corresponding to the newly installed radar unit, without having to physically replace compensator 116. Subtractor 118 is electrically coupled to supply a difference output signal based on subtraction of the output signal from the radar signal compensator 116 from a respective wheel-axle speed signal either having a minimum value when the traction motors operate in the motoring mode, or having a maximum value when the traction motors operate in the electrical braking mode. The output signal from subtractor 118 constitutes the input signal to filter 106.

First sub-processor 102 includes a first processor module 120 used for computing the rate-limited wheel-axle speed signal. First processor module 120 includes a first look up table 122 designed to supply an upper rate limit based on the value of an additively compensated expected acceleration signal. A second look up table 124 is designed to supply a lower rate limit based on a value of a subtractively compensated expected acceleration signal. A rate limiter 126 is electrically coupled to receive the respective wheel-axle speed signal having, as described above, the maximum or the minimum value. Rate limiter 126 is further coupled to receive the respective upper and lower limits from first and second look up tables 122 and 124, respectively in order to set the variable rate range for the received wheel-axle speed signal, that is, the wheel-axle speed signal having the maximum value during motoring, or having the minimum value during the electrical braking. The output signal from rate limiter 126 constitutes the rate-limited wheel-axle speed signal supplied to second sub-processor 104. First sub-processor 102 further includes a second processor module 128 which is used for computing the additively compensated expected acceleration signal and the substractively compensated expected acceleration signal. Second processor module 128 is made up of a compensation look up table 130 that supplies an acceleration compensation signal based on the magnitude of the tractive effort demand signal. It will be appreciated by those skilled in the art that the tractive effort demand signal is conveniently computed in the controller system in response to an operator command using techniques well known in the art. A differentiator 132 is electrically coupled to receive the tractive effort demand signal to supply a respective output signal that is proportional to the derivative of the tractive effort demand signal. Multiplier unit 134 is electrically coupled to receive the output signal from differentiator 132 and is further coupled to receive a signal indicative of vehicle inertia. The vehicle inertia may be empirically derived based on the expected average load of the vehicle or may be estimated using well-known parameter estimation techniques such as Kalman filtering techniques or other standard parameter estimation techniques. Multiplier unit 134 supplies a product output signal indicative of expected acceleration, as the tractive effort demand signal changes. Signal conditioner 136 is coupled to receive a signal indicative of an average measurement of wheel-axle acceleration to supply a suitably conditioned or smoothed average wheel-axle acceleration signal. It will be appreciated that wheel-axle acceleration may be obtained from any suitable direct or indirect acceleration measurement technique. For example, the wheel-axle acceleration could be directly obtained from one or more accelerometers, or it could be derived by differentiating the speed of the wheel-axles and providing any desired filtering to the differentiated signal. A first summer 138 has first and second inputs for receiving at the first input the output signal from multiplier 134 and at the second input the conditioned average wheel-axle acceleration signal to supply a combined output signal. A second summer 140 has first and second inputs for receiving the acceleration compensation signal from look-up table 130 and at the second input the combined output signal from summer 138 to supply a combined output signal that constitutes the additively compensated expected acceleration signal to first look up table 122. A subtractor 142 is electrically coupled to supply a respective difference output signal based on subtraction of the acceleration compensation signal from the combined output signal from summer 138. The respective difference output signal from subtractor 142 constitutes the subtractively compensated expected acceleration signal supplied to second look up table 124. Within the block diagram that represents compensation look-up table 130 there is an exemplary graphical relationship for determining an output value of look-up table 130 as a function of the magnitude of the tractive effort command signal. For example, in a first range corresponding to a tractive effort command signal having a relatively low magnitude, look-up table 130 may supply a compensation signal having a maximum value. It is further shown in the shown graphical relationship in a second range corresponding to a tractive effort command signal having a relatively intermediate magnitude, look-up table 130 may supply a compensation signal that varies substantially linearly as a function of the magnitude of the tractive effort demand signal. The tractive effort command signal naming the relatively intermediate magnitude may be conveniently employed during operational conditions where relatively higher rates of either acceleration or declaration may be encountered, such as during light load operations, yard operations, high grade climb or descent, etc. Finally in a third range corresponding to a tractive effort command signal having a relatively high magnitude, look-up table 130 may supply a compensation signal having a minimum value.

It will be understood that the specific embodiment of the invention shown and described herein is explanatory only. For example although the foregoing processor system has been described in terms of hardware components, such processor is not limited to such hardware implementation since the operational relationships may be readily implemented using software subroutines as may readily be executed in a suitable microprocessor unit using binary signals. Accordingly, numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limited sense and that the scope of the invention be solely determined by the appended claims.

What is claimed is:

1. A processor system for accurately determining true ground speed in a vehicle having wheel-axles propelled by traction motors, the vehicle equipped with a radar unit for providing a radar signal indicative of vehicle speed relative to the ground, the radar signal being substantially accurate when averaged over a sufficiently long period of time but being generally susceptible to undesirable short term variations, the vehicle further equipped with speed sensors coupled to the wheel-axles to respectively supply respective wheel-axle speed signals, the respective wheel-axle speed signals being substantially accurate over a sufficiently short period of time but being generally susceptible to undesirable long term variations, the processor system comprising:

a first subprocessor coupled to process the respective wheel-axle speed signals to supply a wheel-axle speed signal limited to a rate within a range that varies based on predetermined operational parameters of the vehicle; and a second subprocessor coupled to process the radar signal and the rate-limited wheel-axle speed signal from the first subprocessor to supply the true ground speed of the vehicle, the second subprocessor having a filter coupled to supply an estimated creep signal being substantially free of any undesirable short-term variation due to the radar signal, the second subprocessor including a first processor module coupled to process the estimated creep signal from the filter to substantially reduce any undesirable long term variations in the wheel-axle speed signals.

2. The system of claim 1 wherein the first processor module of the second subprocessor comprises:

a subtractor coupled to supply a difference output signal based on subtraction of the estimated creep signal from the rate-limited wheel-axle speed signal; and a comparator coupled to compare the respective magnitudes of the difference output signal and the radar signal so that if the magnitude of the difference output signal is outside a predetermined range about the magnitude of the radar signal, then the comparator supplies a comparator output signal set to the magnitude of the radar signal, otherwise the comparator output signal is set to the magnitude of the difference output signal, the comparator output signal in each case constituting the true ground speed of the vehicle determined by the processor system.

3. The system of claim 2 wherein the second subprocessor further includes a second processor module comprising:

a radar signal compensator coupled to receive the radar signal from the radar unit, the compensator configured to supply an output signal that is substantially compensated for radar lag based on a predetermined lag model of the radar unit; and a subtractor coupled to supply a difference output signal based on subtraction of the output signal from the radar signal compensator from the respective wheel-axle speed signal either having a maximum value when the traction motors operate in a motoring mode, or having a minimum value when the traction motors operate in a braking mode, the difference output signal from this last-recited subtractor constituting the input signal to the filter in the second subprocessor.

4. The system of claim 1 wherein the first subprocessor includes a first processor module for computing the rate-limited wheel-axle speed signal, the first processor module of the first subprocessor comprising:

a first look-up table configured to supply an upper rate limit based on a value of an additively compensated expected acceleration signal;

a second look-up table configured to supply a lower rate limit based on a value of a substractively compensated expected acceleration signal; and a rate limiter coupled to receive the respective wheel-axle speed signal having the maximum or the minimum value, and further coupled to receive the respective upper and lower limits from the first and second look-tables to set the rate range for the received wheel-axle speed signal, the output signal from the rate limiter constituting the rate-limited wheel-axle speed signal supplied to the second subprocessor.

5. The system of claim 4 wherein the first subprocessor further comprises a second processor module for computing the additively compensated expected acceleration signal and the subtractively compensated expected acceleration signal, the second processor module of the first subprocessor comprising:

a compensation look-up table supplying an acceleration compensation signal based on the magnitude of a tractive effort demand signal;

a differentiator coupled to receive the tractive effort demand signal to supply a respective output signal that is proportional to the derivative of the tractive effort demand signal;

a multiplier unit coupled to receive the output signal from the differentiator and further coupled to receive a signal indicative of vehicle inertia, the multiplier unit adapted to produce a product output signal indicative of expected acceleration as the tractive effort demand signal changes;

a signal conditioner coupled to receive an average wheel-axle acceleration signal to supply a conditioned average wheel-axle acceleration signal;

a first summer having first and second inputs for receiving at the first input the output signal from the multiplier and at the second input the conditioned average wheel-axle acceleration signal to supply a combined output signal;

a second summer having first and second inputs for receiving at the first input the acceleration compensation signal and at the second input the combined output signal from the first summer to supply a combined output signal that constitutes the additively-compensated expected acceleration signal supplied to the first look-up table; and a subtractor coupled to supply a respective difference output signal based on subtracting the acceleration compensation signal from the combined output signal from the first summer, the respective difference output signal from this subtractor constituting the subtractively-compensated expected acceleration signal supplied to the second look-up table.

6. The system of claim 1 wherein the filter coupled to supply the estimated creep signal is a low pass filter.

7. A method for accurately determining true ground speed in a vehicle having wheel-axles propelled by traction motors, the vehicle equipped with a radar unit for providing a radar signal indicative of vehicle speed relative to the ground, the radar signal being substantially accurate when averaged over a sufficiently long period of time but being generally susceptible to undesirable short term variations, the vehicle further equipped with speed sensors coupled to the wheel-axles to respectively supply respective wheel-axle speed signals, the respective wheel-axle speed signals being substantially accurate over a sufficiently short period of time but being generally susceptible to undesirable long term variations, the method comprising the steps of:

processing the respective wheel-axle speed signals in a first subprocessor to supply a wheel-axle speed signal limited to a rate within a range that varies based on predetermined operational parameters of the vehicle; and processing the radar signal and the rate-limited wheel-axle speed signal in a second subprocessor to supply the true ground speed of the vehicle, the processing in the second subprocessor including a signal filtering step for supplying an estimated creep signal being substantially free of any undesirable short-term variation due to the radar signal, and further including processing the estimated creep signal to substantially reduce any undesirable long term variations due to the wheel-axle speed signals.

8. The method of claim 7 wherein the processing step in the second subprocessor further includes:

subtracting the estimated creep signal from the rate-limited wheel-axle speed signal to supply a difference output signal; and comparing the respective magnitudes of the difference output signal and the radar signal so that if the magnitude of the difference output signal is outside a predetermined range about the magnitude of the radar signal, then the comparing step allows to provide an output signal having a magnitude set to the magnitude of the radar signal, otherwise the comparing step allows for setting that output signal to the magnitude of the difference output signal, the output signal resulting from the comparing step in each case constituting the true ground speed of the vehicle determined by this method.

9. The method of claim 8 wherein the second processing step further includes:

compensating for lag the radar signal from the radar unit to supply a lag-compensated radar signal; and subtracting the lag-compensated radar signal from a respective wheel-axle speed signal either having a maximum value when the traction motors operate in a motoring mode, or having a minimum value when the traction motors operate in a braking mode, this subtracting step resulting in a difference output signal that constitutes the input signal being filtered in the filtering step.

10. The method of claim 7 wherein the processing step in the first subprocessor further comprises computing the rate-limited wheel-axle speed signal, this computing step including:

providing a first look-up table configured to supply an upper rate limit based on the value of an additively compensated expected acceleration signal;

providing a second look-up table configured to supply a lower rate limit based on the value of a substractively compensated expected acceleration signal; and limiting the respective wheel-axle speed signal having the maximum or the minimum value to a rate within a variable rate range, the respective upper and lower limits from the first and second look-tables determining the rate range for that wheel-axle speed signal, the output signal resulting from this rate limiting step constituting the rate-limited wheel-axle speed signal processed in the second subprocessor.

11. The method of claim 10 wherein the processing step in the first subprocessor further comprises a step for computing the additively compensated expected acceleration signal and the subtractively compensated expected acceleration signal, this computing step including:

providing a compensation look-up table supplying an acceleration compensation signal based on the magnitude of a tractive effort demand signal;

passing the tractive effort demand signal through a differentiator to supply a respective output signal that is proportional to the derivative of the tractive effort demand signal;

providing a multiplier unit to receive the output signal from the differentiator and to receive an externally derived signal indicative of vehicle inertia, the multiplier unit adapted to supply a product output signal indicative of expected acceleration as the tractive effort demand signal changes;

conditioning an externally derived average wheel-axle acceleration signal to supply a first conditioned average wheel-axle acceleration signal;

summing the output signal from the multiplier and the conditioned average wheel-axle acceleration signal to supply a combined output signal;

summing the acceleration compensation signal and the first combined output signal to supply a second combined output signal that constitutes the additively-compensated expected acceleration signal supplied to the first look-up table; and subtracting the acceleration compensation signal from the first combined output signal to supply a respective difference output signal, the respective difference output signal from this subtracting step constituting the subtractively-compensated expected acceleration signal supplied to the second look-up table.

12. The system of claim 7 wherein the filtering step uses a low pass filter to supply the estimated creep signal.

* * * * *